US012737008B2

(12) United States Patent
Jeong

(10) Patent No.: US 12,737,008 B2
(45) Date of Patent: Sep. 15, 2026

(54) DISPLAY APPARATUS

(71) Applicant: LG Display Co., Ltd., Seoul (KR)

(72) Inventor: Hyeontae Jeong, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 182 days.

(21) Appl. No.: 18/354,181

(22) Filed: Jul. 18, 2023

(65) Prior Publication Data

US 2024/0028077 A1 Jan. 25, 2024

(30) Foreign Application Priority Data

Jul. 22, 2022 (KR) ........................ 10-2022-0091258

(51) Int. Cl.
*G06F 1/16* (2006.01)
*G06F 1/18* (2006.01)

(52) U.S. Cl.
CPC .......... *G06F 1/1637* (2013.01); *G06F 1/1626* (2013.01); *G06F 1/181* (2013.01); *G06F 2200/1613* (2013.01)

(58) Field of Classification Search
CPC .... G06F 1/1601; G06F 1/1603; G06F 1/1607; G06F 1/1609; G06F 1/1637
See application file for complete search history.

(56) References Cited

U.S. PATENT DOCUMENTS 5,233,451 A * 8/1993 Iguchi ................. G02F 1/13452 439/62
5,729,310 A * 3/1998 Horiuchi .............. G02B 6/0088 349/64
5,870,160 A * 2/1999 Yanagawa ......... G02F 1/136204 349/110
5,966,191 A * 10/1999 Lee ................... G02F 1/133308 349/58
6,246,459 B1 * 6/2001 Simhambhatla .. G02F 1/133385 349/149
6,549,263 B1 * 4/2003 Kim .................. G02F 1/133308 349/58
6,777,621 B2 * 8/2004 Ishikawa .................. G09F 9/30 361/783
6,967,701 B1 * 11/2005 Kim .................. G02F 1/133608 349/110
7,667,784 B2 * 2/2010 Kim .................. G02F 1/133512 349/110
8,611,077 B2 * 12/2013 Sanford ................ G06F 1/1626 361/679.21
10,019,029 B1 * 7/2018 Yu ........................ H05K 7/1417
10,795,201 B2 * 10/2020 Nakamura .............. G02F 1/139
10,809,434 B2 * 10/2020 Oh .................... G02F 1/133605
10,943,748 B2 * 3/2021 Sanford ................. H10D 86/60
11,016,612 B2 5/2021 Han et al.
(Continued)

FOREIGN PATENT DOCUMENTS

EP 3987758 B1 * 3/2025 ......... H10K 59/8791
KR 10-2013-00043204 A 4/2013
(Continued)

*Primary Examiner* — Adrian S Wilson
(74) *Attorney, Agent, or Firm* — Fenwick & West LLP

(57) ABSTRACT

The present disclosure relates to a display device, in which a cover member disposed on a display panel includes a first cover, a light blocking member, a filler, and a second cover, thereby removing air bubbles and a lift phenomenon that may be generated by the cover member.

16 Claims, 9 Drawing Sheets

(56) References Cited

U.S. PATENT DOCUMENTS 11,991,897 B2 * 5/2024 Park .................... H10K 59/38
2001/0010569 A1 * 8/2001 Jin .................... G02F 1/133308 349/122
2003/0133070 A1 * 7/2003 Nam .................... G02F 1/133308 349/158
2007/0008449 A1 * 1/2007 Choi .................... G02F 1/133615 349/58
2009/0122475 A1 * 5/2009 Kim .................... G02F 1/13336 445/24
2010/0315570 A1 * 12/2010 Mathew .................... G06F 1/1601 349/56
2011/0075342 A1 * 3/2011 Gotham .................... G06F 1/1607 361/679.01
2012/0020000 A1 * 1/2012 Mathew .................... G06F 1/1601 349/110
2012/0050958 A1 * 3/2012 Sanford .................... H01H 13/04 361/679.01
2012/0243091 A1 * 9/2012 Amm .................... G06F 1/1647 359/489.07
2014/0091336 A1 * 4/2014 Sanford .................... H10D 86/481 257/88
2014/0111927 A1 * 4/2014 Raff .................... G06F 1/1637 156/60
2014/0239781 A1 * 8/2014 Allore .................... H05K 5/03 312/223.1
2014/0240615 A1 * 8/2014 Allore .................... H05K 5/0017 361/679.01
2014/0240911 A1 * 8/2014 Cole .................... B29D 11/00009 361/679.3
2015/0085429 A1 * 3/2015 Memering .................... G06F 1/1613 361/679.01
2015/0185537 A1 * 7/2015 Yamashita .................... G02F 1/133308 349/58
2017/0187934 A1 * 6/2017 Kwak .................... G06F 1/1686
2017/0308124 A1 * 10/2017 Mathew .................... G06F 1/16
2018/0157375 A1 6/2018 Han et al.
2020/0119303 A1 * 4/2020 Lo .................... H05K 5/03
2020/0192013 A1 * 6/2020 Oh .................... G02F 1/13306
2021/0016538 A1 1/2021 Kwon et al.
2021/0016718 A1 1/2021 Chi et al.
2021/0176872 A1 * 6/2021 Woo .................... H10K 59/60
2021/0384456 A1 12/2021 Kim et al.
2021/0384467 A1 * 12/2021 Park .................... H10K 59/877
2022/0155825 A1 * 5/2022 Kim .................... G06F 1/1626

FOREIGN PATENT DOCUMENTS

KR 10-2018-0064610 A 6/2018
KR 10-2019-0127161 A 11/2019
KR 20210070880 A * 6/2021 .................... G06F 1/1656
KR 10-2021-0150651 A 12/2021
KR 10-2022-0065976 A 5/2022
WO 2019/120898 A1 6/2019

* cited by examiner

DISPLAY APPARATUS

CROSS-REFERENCE TO RELATED APPLICATION

The present application claims priority to Republic of Korea Patent Application No. 10-2022-0091258, filed on Jul. 22, 2022, which is incorporated by reference in its entirety.

FIELD

The present disclosure relates to a display device, and more particularly, to a structure for improving bubble defects in a cover member disposed on a display panel and a bonding structure with a housing disposed below the display panel.

BACKGROUND

Various schemes and types of display devices have been widely used that display images on televisions (TVs), monitors, smartphones, tablet personal computers (PCs), notebook computers and the like.

Among the display devices, following liquid crystal display (LCD) devices that have been widely used so far, organic light emitting diode devices (or organic light emitting display devices (OLED) have been increasingly used, and an application range thereof has been widely expanded.

Display devices include a display panel, and when a display panel implements an image using liquid crystal, the display device can be classified as a liquid crystal display (LCD), and when the display panel implements an image using an organic light emitting device, the display device can be classified as an organic light emitting display device (OLED).

The display device may be used in various places. For example, the display device may be disposed on a seat of an aircraft, disposed on a dashboard of a vehicle, or in front of a passenger seat of a vehicle.

The display device may include a cover member disposed on the display panel and made of a transparent material. The cover member may serve to protect the display panel from external scratches or contamination.

A housing may be disposed below the cover member to protect a lower portion and a side surface of the display panel.

In addition, a light blocking member is disposed in an edge region of an end of the cover member to prevent a non-display area of the display panel and a bonding region with the housing from being recognized by the user.

SUMMARY

The light blocking member disposed in the edge region of the end of the cover member may have a certain thickness, and a stepped portion may be formed between the cover member and the light blocking member.

Further, in order to dispose the cover member on the display panel, a transparent adhesive material in the form of a sheet may be positioned between the display panel and the cover member.

The transparent adhesive material is disposed on an entire region between the display panel and the cover member, and in the stepped portion where the light blocking member is located, a sheet-shaped transparent adhesive material may not be uniformly attached and consequently, a region in which the transparent adhesive material is lifted may occur.

In addition, since the cover member uses a material such as glass or plastic having high hardness and low shock absorption performance, the cover member does not absorb external shock and transmits it to the display panel, and the display panel may be easily damaged by the external shock.

In addition, a display device including a flat display panel has a problem in that it is difficult to form curves.

The present disclosure provides a display device capable of eliminating a phenomenon in which the transparent adhesive material is lifted by the light blocking member disposed on the cover member.

In addition, the present disclosure provides the display device in which an external shock is absorbed by the cover member.

In addition, the present disclosure provides the display device having a curved surface while using a flat display panel.

The technical problem to be achieved by the present disclosure is not limited to the above-mentioned technical problem, and other technical problems that are not mentioned will be clearly understood by ordinary-skilled persons in the art to which the present disclosure pertains from the following description.

One embodiment is a display device including a display panel on which images are displayed; and a cover member disposed on the display panel and having a first cover, a light blocking member, and a second cover.

Another embodiment is a display device including a display panel on which images are displayed; a cover member disposed on the display panel and having a first cover, a light blocking member, and a second cover; and a housing having a first housing portion positioned next to the display panel while supporting the second cover, and a second housing portion positioned below the display panel.

Other embodiment specifics are included in the detailed description and drawings.

Technical Advantages

According to an embodiment of the present disclosure, the cover member disposed on the display panel includes a first cover, a second cover, and a filler, so that air bubbles and a lift phenomenon caused by the light blocking member can be removed.

In addition, an external shock applied to the display device can be absorbed through the filler included in the cover member, and thus the display panel can be protected from the external shock.

In addition, it is possible to implement a curved display device using a flat display panel by applying a curved cover member.

The effects of the present disclosure are not limited to the above-described effects, and other effects which are not described herein will become apparent to those skilled in the art from the following description.

DETAILED DESCRIPTION

Figure 1:
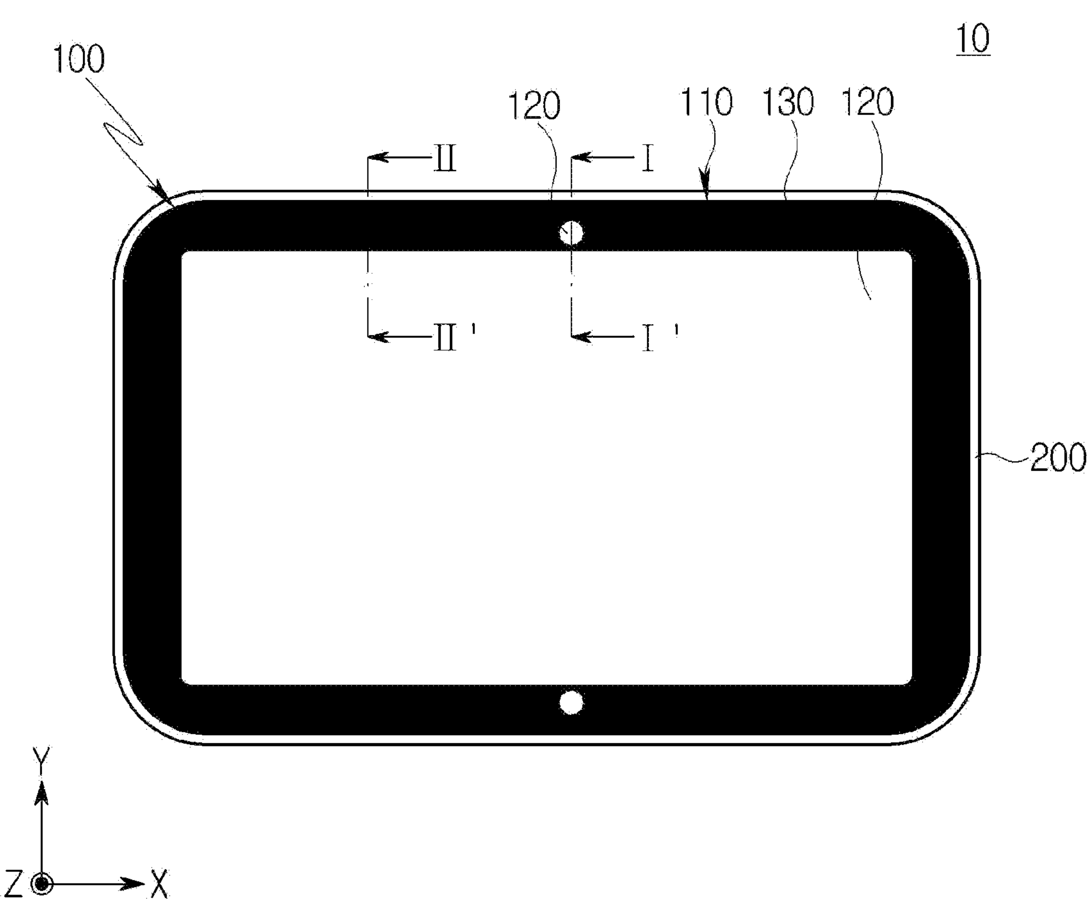
FIG. 1 is a plan view of a display device according to an embodiment of the present disclosure.

Hereinafter, detailed description to implement the present disclosure will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, scopes of claims of the present disclosure are not limited by embodiments described in the present disclosure.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as “including,” “having,” and “comprise” used herein are generally intended to allow other components to be added unless the terms are used with the term “only”. Any references to singular may include plural unless expressly stated otherwise.

Components are interpreted to include an ordinary error range even if not expressly stated.

When the position relation between two parts is described using the terms such as “on”, “above”, “below”, and “next”, one or more parts may be positioned between the two parts unless the terms are used with the term “immediately” or “directly” is not used.

When an element or layer is disposed “on” the other element or layer, another layer or another element may be interposed directly on the other element or therebetween.

Although the terms “first”, “second”, and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways as understood by those skilled in the art, and the embodiments can be carried out independently of or in association with each other.

The display device of the present specification may be applied to a liquid crystal display device and an organic light emitting display device, but is not limited thereto, and may be applied to various display devices such as an LED display device or a quantum dot display device.

Hereinafter, exemplary embodiments of the present invention will be described in further detail with reference to the accompanying drawings.

FIG. 1 is a plan view of a display device according to an embodiment of the present disclosure.

Referring to FIG. 1, the display device 10 may include a cover member 100 and a housing 200.

The cover member 100 is formed of a transparent material and is disposed on the display panel to protect the display panel from external impact and external contamination.

The cover member 100 includes a first cover 110 and a second cover 120 positioned below the first cover 110, and may include a light blocking member 130 disposed in an edge region of an end of the first cover 110.

In addition, since an injection hole 122 is formed in the second cover 120, a filler may be injected between the first cover 110 and the second cover 120.

The injection hole 122 may be formed in an upper region and a lower region on a plane of the second cover 120 where the light blocking member 130 is located, and the formation position of the injection hole 122 is not limited thereto.

The housing 200 supports the cover member 100 below the cover member 100, has a shape surrounding a side surface and bottom surface of the display panel, protects the display panel from external impact, and prevent inflow of external foreign substances or moisture into the display device 10. A side surface of the display panel may be a side surface of the display panel.

The display panel may have a structure surrounded by the cover member 100 and the housing 200 to protect the display panel.

Figure 2A:
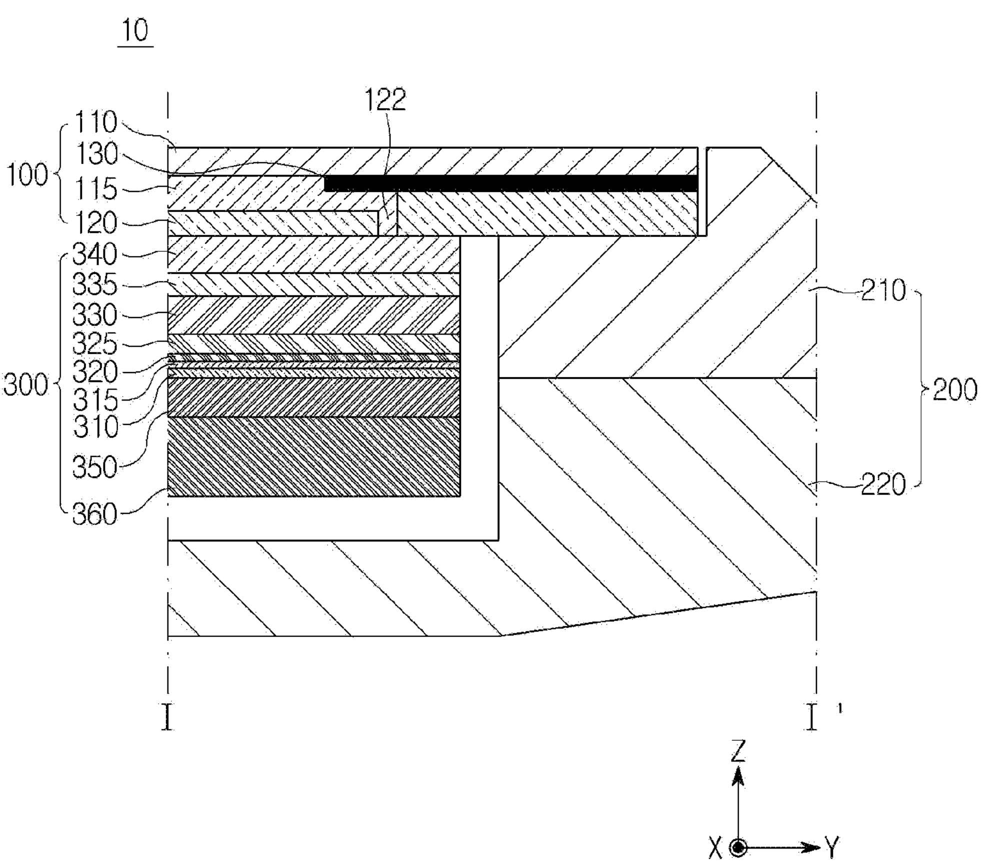
FIG. 2A is a cross-sectional view taken along line I-I' in FIG. 1 according to an embodiment of the present disclosure.

FIG. 2A is a cross-sectional view taken along line I-P in FIG. 1 according to an embodiment of the present disclosure.

Referring to FIG. 2A, a display panel 300 is disposed between the cover member 100 and the housing 200. The display panel 300 may include a display substrate 310, a thin film transistor array 315, a light emitting layer 320, an encapsulation member 325, a first adhesive layer 330, a touch film 335, and a second adhesive layer 340. The display panel 300 may be fixed to the cover member 100 by the second adhesive layer 340.

Since the second adhesive layer 340 must transmit an image of the display panel 300 therethrough while attaching the display panel 300 to the cover member 100, the second adhesive layer 340 may be formed of, or include an optical clear adhesive (OCA), optical clear adhesive resin (OCR) or pressure sensitive adhesive (PSA) which has high adhesive strength and transmittance. A material of the second adhesive layer 340 is not limited thereto.

The display substrate 310 may be made of plastic or glass material. In the case of using a substrate made of plastic, as the substrate made of plastic has thin and flexible characteristics, the substrate made of plastic is widely used in a flexible display device that can be bent and folded. In the case of a substrate made of glass, as the substrate has a flat surface and a certain level of strength and hardness, it is easy to form a driving thin film transistor and a light emitting element on the substrate.

A small sized organic light emitting display device is widely used in smartphones, and plastic substrates may be used to apply to flexible and foldable displays. The plastic substrate may be made of a polymer or polyimide (PI), and may be configured by stacking a plurality of layers to increase strength.

In addition, since a medium-large sized organic light emitting display device has a larger area than a small organic light emitting display device, the number of driving circuits and pixels increases, and a substrate made of glass capable of continuously maintaining flatness can be used. A material of the display substrate 310 is not limited thereto, and various materials may be used.

A thin film transistor array 315 may be disposed on the display substrate 140. The thin film transistor array 315 may include a plurality of sub-pixels for displaying an image and a driving circuit portion for driving the plurality of sub-pixels. The driving circuit portion may include a thin film transistor layer including a gate electrode, an active layer, a source electrode, and a drain electrode.

In the case of an organic light emitting display device, an emission layer 320 may be disposed on the thin film transistor array 315. Each of the plurality of sub-pixels includes a light emitting layer 320, and the light emitting layer 320 may include a first electrode, a light emitting element, and a second electrode. The light emitting layer 320 may be disposed to correspond to a display area of the substrate. The light emitting layer 320 may emit light using a high-potential data voltage supplied to the first electrode and a low-potential common voltage supplied to the second electrode through the thin film transistor array 315. Light generated from the light emitting element is emitted to a front surface, so that a desired image can be realized.

In the case of a liquid crystal display device, the liquid crystal display device may include the thin film transistor array 315, the first electrode, a liquid crystal layer, and the second electrode. The liquid crystal layer may be driven by a data voltage supplied to the second electrode and a common voltage supplied to the first electrode through the thin film transistor array 315, and a desired image can be implemented by blocking a backlight disposed below the display panel 300 from the liquid crystal layer or passing the backlight.

The encapsulation member 325 may be disposed on the light emitting layer 320. The encapsulation member 325 may be disposed to protect the thin film transistor array 315 and the light emitting layer 320 from external impact and to prevent oxygen or moisture from penetrating the thin film transistor array 315 and the light emitting layer 320. The encapsulation member 325 may include at least one or more inorganic films and one or more organic films, but is not limited thereto.

An optical film may be further disposed on the encapsulation member 325. The optical film may have a structure in which one or more functional layers are stacked one on top of another, but is not particularly limited.

In one example, the optical film may include an antireflection layer such as a polarizing film that prevents or at least reduces reflection of external light to improve an outdoor visibility and a contrast ratio for an image displayed on the display panel 300. In addition, in one example, the optical film may further include a barrier layer for preventing moisture or oxygen invasion. The barrier layer may be formed of a material having low moisture permeability, such as a polymer material.

A touch film 335 may be disposed on the encapsulation member 325. The touch film 335 may be positioned between the cover member 100 and the encapsulation member 325 and may be fixed by the first adhesive layer 330.

The touch film 335 may be formed by disposing a transmitting touch electrode and a receiving touch electrode between a plurality of transparent substrates made of glass or plastic, or by disposing the transmitting touch electrode and the receiving touch electrode on top or bottom of a transparent substrate made of glass or plastic, or on both top and bottom surfaces thereof.

A structure of the touch film 335 is not limited thereto. The touch film 335 may also include a structure in which the transmitting touch electrode and the receiving touch electrode are directly disposed on the encapsulation member 325 without the transparent substrate, or the touch electrode is formed inside the thin film transistor array 315.

The cover member 100 may be disposed on the touch film 335. The cover member 100 may include the first cover 110, the filler 115, and the second cover 120, and the light blocking member 130 may be disposed at an edge region of an end of the first cover 110.

The second cover 120 may be made of a highly translucent material in order to increase the transmittance of light generated from the light emitting layer 320. For example, the second cover 120 may be made of an acrylic resin such as polymethylmethacrylate (PMMA) or a material such as polycarbonate (PC).

In addition, the injection hole 122 is formed in the second cover 120, such that the filler 115 can be injected between the first cover 110 and the second cover 120. The filler 115 may be made of a material such as an optical clear resin (OCR) having a high adhesion, high transmittance, and low viscosity.

Since the filler 115 has properties of a liquid similar to that of resin, the filler 115 can fill an empty space between the first cover 110 and the second cover 120, such that bubbles generated in the cover member 100 can be prevented.

In addition, the lift phenomenon of the transparent adhesive material that may be occur in the stepped portion, formed due to a thickness of the light blocking member 130 disposed in the edge region of the end of the first cover 110, can be prevented.

That is, by applying the filler 115 having the properties of a resin in the sheet-shaped transparent adhesive material, it is possible to improve bubbles and the lift phenomenon generated by the light blocking member 130, and a thickness of the light blocking member 130 may be formed freely.

In addition, since the filler 115 having a low viscosity is included in the middle of the cover member 100, when an external impact is applied, the filler 115 absorbs the shock, such that the cover member 100 and the display panel 300 can be prevented from being damaged by external impact.

Since the impact is absorbed by the filler 115, a thickness of the first cover 110 or the second cover 120, which is vulnerable to impact, can be formed thin. Therefore, the entire thickness of the cover member 100 can be formed thin.

In addition, it is also possible to apply glass having lower strength than plastic as a material of the first cover 110 due to the improvement of the shock absorption function by the filler 115. When the first cover 110 is made of a glass material, the visibility of an image displayed on the display panel 300 may be increased due to high light transmittance of the glass material. In addition, since the glass material has low surface roughness, when the screen of the display device 10 is touched, touch sensitivity may also increase.

The housing 200 may be disposed below the cover member 100. The housing 200 may support an end region of the cover member 100. The housing 200 may protect a bottom and side surfaces of the display panel 300 from external impact, and may prevent external foreign substances or contaminants from penetrating into the display panel. The end region of the cover member 100 may be an edge region including an end of the cover member 100.

The end region of the cover member 100 to which the display panel 300 is attached is seated at an end of an edge of the housing 200 such that the cover member 100 and the housing 200 can be combined, and a connecting member such as an adhesive, a fixing member, or a connector is disposed between the cover member and the housing 200 to improve a bonding strength between the cover member 100 and the housing 200.

The housing 200 may be formed integrally or separately. In the case of a separation-type housing, a first housing portion 210 and a second housing portion 220 may be included. The first housing portion 210 may be a portion bonded to the cover member 100, and the second housing portion 220 may be a portion disposed below the first housing portion 210. In the case of the separation-type housing 200, when the display panel 300 or a lower region of the housing 200 is damaged, it is possible to repair the display panel 300 by separating the second housing portion 220, and the damaged second housing portion 220 can be easily replaced.

Figure 2B:
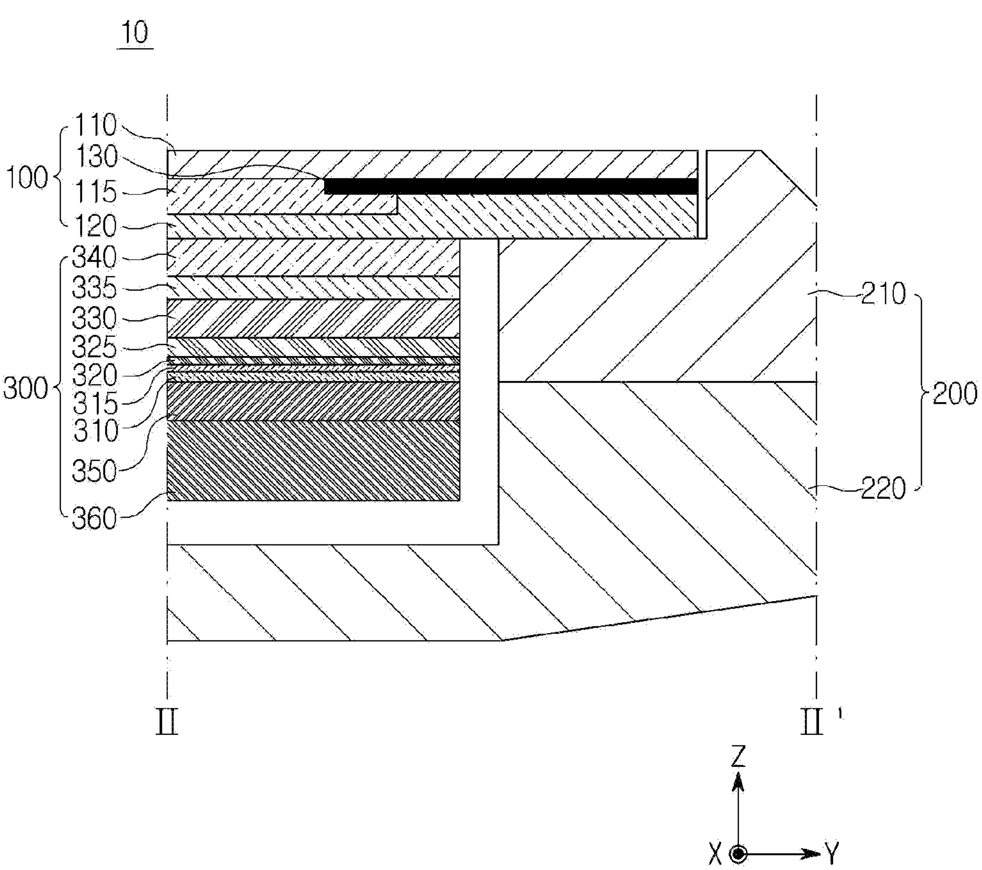
FIG. 2B is a cross-sectional view taken along line II-II' in FIG. 1 according to an embodiment of the present disclosure.

FIG. 2B is a cross-sectional view taken along line II-IF in FIG. 1 according to one embodiment of the present disclosure.

Referring to FIG. 2B, a cross-sectional view of a region without the injection hole in the second cover 120 of the cover member 100 is illustrated. The cover member 100 may include the first cover 110, the second cover 120, the filler 115, and the light blocking member 130.

The injection hole may be formed in the second cover 120 and may be formed in a region where the light blocking member 130 is located so as not to be visually recognized by a user. The number and locations of injection holes may be applied in various ways.

Since a region where the injection hole is not formed is blocked by the second cover 120, the filler 115 may be filled without gaps.

According to another embodiment of the present disclosure, the cover member 100 may include the first cover 110, the light blocking member 130, and the filler 115, while the second cover 120 may be omitted.

The cover member 100 may be formed by disposing the light blocking member 130 on the first cover 110 and applying the filler 115 having a high adhesion and transmittance and a low viscosity to the first cover 110.

The filler 115 may be applied to the same thickness as or a greater thickness than a thickness of the light blocking member 130 such that the filler 115 can be placed only on an inside of the light blocking member 130 or can cover an upper surface of the light blocking member 130 thinly.

The display device 10 may be formed by directly attaching the display panel 300 to the cover member 100 applied with the filler 115 and attaching the housing 200 to the light blocking member 130.

According to still another embodiment of the present disclosure, the cover member 100 may include the first cover 110, the light blocking member 130, and the second cover 120, and the filler may be omitted.

The cover member 100 may be configured by disposing the light blocking member 130 on the first cover 110 and disposing the second cover 120 below the light blocking member 130. The second cover may be fixed or attached to the first cover 110 by the light blocking member 130.

Accordingly, a separation space may be formed in a partial region between the first cover 110 and the second cover 120. The separation space may be filled with air or other gas.

A structure in which the filler is omitted between the first cover 110 and the second cover 120 may have higher light transmittance compared to the structure filled with the filler, and bubbles and the lift phenomenon generated by the transparent adhesive material may be prevented. However, the omission of the filler may lower shock absorption performance FIG. 3 is an exploded perspective view illustrating the cover member according to an embodiment of the present disclosure.

Figure 3:
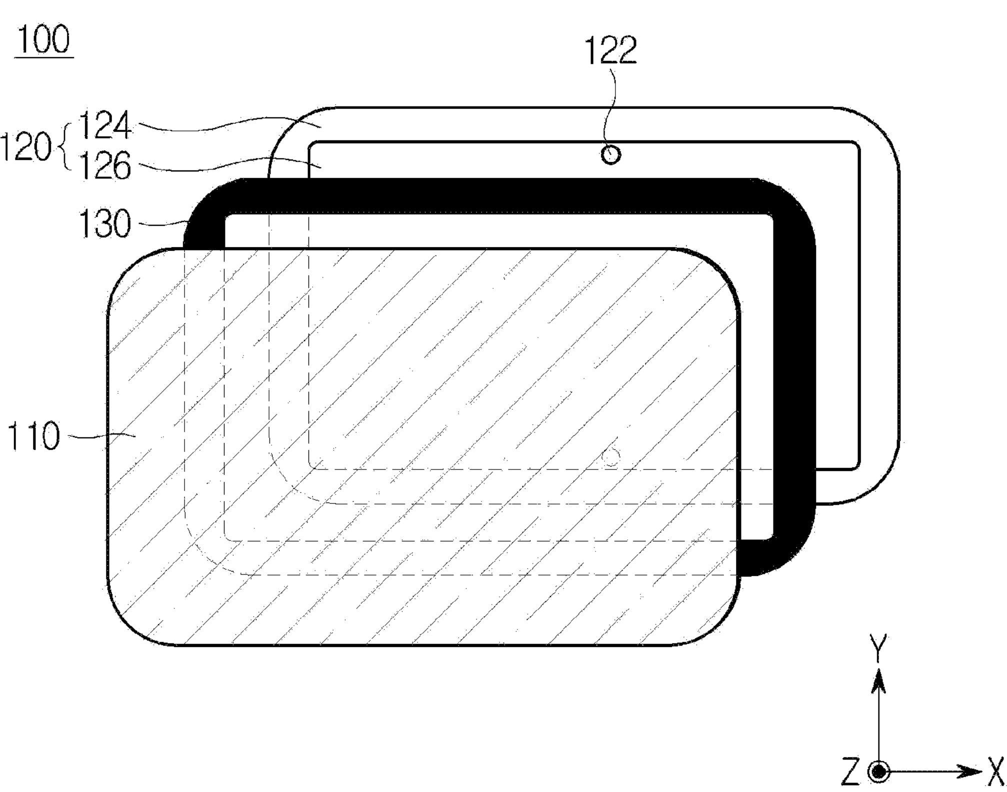
FIG. 3 is an exploded perspective view illustrating the cover member according to an embodiment of the present disclosure.

Referring to FIG. 3, the cover member 100 may include the first cover 110, the second cover 120, the filler 115 and the light blocking member 130.

The second cover 120 of the cover member 100 may include a first portion 124 that is an edge region and a second portion 126 surrounded by the first portion 124. The first portion 124 is a portion that is thicker than the second portion 126, the light blocking member 130 and the first cover 110 may be disposed on the first portion 124, and the first portion 124 may support the light blocking member 130 and the first cover 110.

The second portion 126 is a portion that is thinner than the first portion 124, the second cover 120 may have a stepped portion between the first portion 124 and the second portion 126, and a separation space may be formed between the first cover 110 and the second cover 120.

The injection hole 122 is formed in the second portion 126 of the second cover 120, and through the injection hole 122, the filler 115 may be inserted between the first cover 110 and the second portion 126.

The injection hole 122 is formed by forming a hole in the second cover 120 and may be recognized by the user. Accordingly, in order to prevent the injection hole 122 from being visible to the user, the light blocking member 130 may be disposed to extend to a region where the injection hole 122 is located such that the light blocking member 130 overlaps with the injection hole 122.

The light blocking member 130 may be disposed in an edge region of an end of the display panel 100 where the first portion 124 is located. The light blocking member 130 may extend to a partial region of the second portion 126 to prevent the injection hole 122 from being visible in the region where the injection hole 122 is formed. In a region where the injection hole 122 is not formed, the light blocking member 130 may be formed without a portion extending to the second portion 126.

The light blocking member 130 overlaps a region where the cover member 100 and the housing 200 are bonded, and thus, the region where the cover member 100 and the housing 200 are bonded may be prevented from being recognized by the user.

The light blocking member 130 may be disposed to correspond to at least the non-display area of the display device 10 and the display panel 300 to prevent wirings and circuits formed in the non-display area of the display panel 300 from being seen.

The light blocking member 130 may be made of a material capable of absorbing light. For example, the light blocking member 130 may be formed of a black matrix or may be formed by printing black ink. Black ink may also be double-printed to enhance a light-blocking effect. The material and structure of the light blocking member 130 are not limited thereto.

Figure 4:
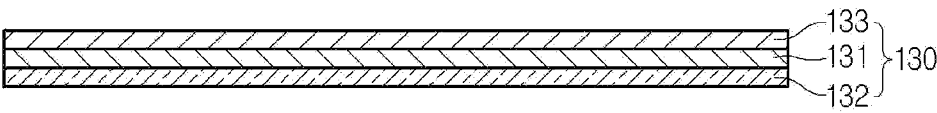
FIG. 4 is a cross-sectional view illustrating a light blocking member according to an embodiment of the present disclosure.
Figure 4:
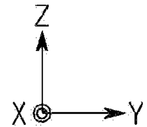

FIG. 4 is a cross-sectional view illustrating the light blocking member according to an embodiment of the present disclosure.

Referring to FIG. 4, the light blocking member 130 includes a base substrate 131, a first layer 132 disposed below the base substrate 131, and a second layer 133 disposed on the base substrate 131.

The first layer 132 and the second layer 133 may be made of an adhesive material to attach and fix the first cover 110 and the second cover 120 thereto. The second layer 133 may have a plurality of embossed patterns such as concave-convex structures.

The base substrate 131 may serve to hold shapes of the first layer 132 and the second layer 133, and the base substrate 131 may be made of a material having constant strength and hardness to maintain the shapes. For example, the base substrate 131 may be made of a material such as polyethylene terephthalate (PET), but is not limited thereto.

The base substrate 131 may be formed by including carbon (or graphite) or black ink, or may be formed in black color by coating carbon (or graphite) or black ink powder on the base substrate 131.

By forming the base substrate 131 in black color, the light blocking member 130 may block light, and components disposed below the light blocking member 130 can be prevented from being recognized by a user.

At least one of the first layer 132 and the second layer 133 may be formed of an adhesive material having a transparent color. Even if the first layer 132 or the second layer 133 does not have a light-blocking function, a black color of the base substrate 131 is transmitted through the first layer 132 or the second layer 133 such that the light-blocking function can be maintained.

Similar to the base substrate 131, the first layer 132 or the second layer 133 may also be formed by including carbon (or graphite) or black ink, or may be coated in a black color.

According to the embodiment of the present disclosure, a design of the non-display area, which is an edge region of the display device 10, may be improved by applying not only a black color but also various colors and patterns having a light blocking function to the base substrate 131.

Figure 5:
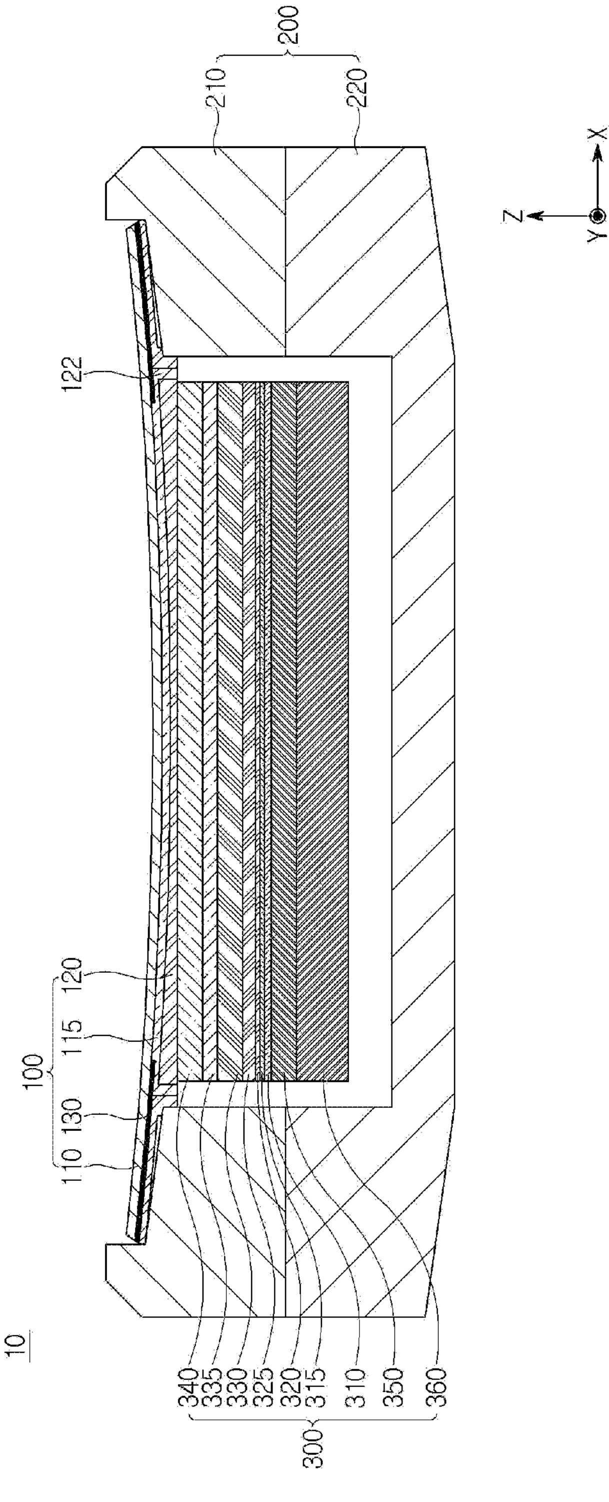
FIGS. 5 and 6 are cross-sectional views of a display device according to other embodiments of the present disclosure.

FIG. 5 is a cross-sectional view of the display device according to another embodiment of the present disclosure.

Referring to FIG. 5, the display device 10 may include the cover member 100, the housing 200 and the display panel 300.

The cover member 100 may include the first cover 110 and the second cover 120 positioned below the first cover 110, and the light blocking member 130 disposed in an edge region of an end of the first cover 110.

In addition, the injection hole 122 is formed in the second cover 120, such that the filler 115 can be injected between the first cover 110 and the second cover 120. The filler 115 may be injected between the first cover 110 and the second cover 120. The filler 115 may be made of a material such as an optical clear resin (OCR) having a high adhesion, high transmittance, and low viscosity. Since the filler 115 has properties of a liquid similar to that of resin, the filler 115 can fill all the empty spaces between the first cover 110 and the second cover 120.

An upper surface of the cover member 100 may be formed to have a constant curvature along a first direction (X axis or Y axis), and a lower surface of the cover member 100 may be formed flat. That is, the upper surface of the cover member 100 may have a structure that is curved concavely along the first direction (X-axis or Y-axis).

When the upper surface of the cover member 100 has a certain curvature and the lower surface of the cover member 100 is formed flat, it is possible to implement a curved display using the flat display panel 300. That is, even if the flat display panel 300 is connected to the lower surface of the flat cover member 100 as it is, since the upper surface of the cover member 100 is curved, the display device 10 may have a shape of a curved display.

The curved display is the display device 10 in which an upper surface of the display device 10 has a constant curvature, and may provide a user with a sense of immersion in the display device 10 and an improved design.

The first cover 110 may have a constant curvature along the first direction (X axis or Y axis) such that the upper surface of the cover member 100 has a constant curvature. For example, the upper and lower surfaces of the first cover 110 may be entirely bent or only the upper surface may be bent to have a constant curvature.

In addition, the lower surface of the second cover 120 may be formed flat such that the lower surface of the cover member 100 is formed flat, and the upper surface of the cover member 100 corresponds to a lower surface of the first cover 110 to have a certain curvature or be formed flat.

For example, an upper surface of the second cover 120 may be formed to have the same curvature as a curvature of the first cover 110, such that a separation distance between the second cover 120 and the first cover 110 is generally the same. Accordingly, a phenomenon in which light is refracted by the filler 115 filled between the first cover 110 and the second cover 120 can be minimized.

Alternatively, the upper surface of the second cover 120 may be formed to have a curvature different from that of the first cover 110 to correct image distortion.

The cover member 100 has a certain curvature on the upper surface and a flat lower surface, such that the cover member 100 may have different thicknesses for each region. The cover member 100 having different thicknesses for each region has different light refractive indices for each region, and when the light generated from the display panel 300 passes through the cover member 100, the image may be distorted due to the different light refractive indices.

Accordingly, the upper surface of the second cover 120 may be formed to have a curvature different from that of the first cover 110. For example, by forming the second cover 120 to have a smaller radius of curvature than the first cover 110, it is possible to reduce the separation distance between the second cover 120 and the first cover 110 in an intermediate region, and to increase the separation distance in a side region, such that the light refractive indices can be adjusted by the filler between the first cover 110 and the second cover 120, and the image distortion can be corrected. The side region of the second cover 120 may be a certain region near a right or left end of the second cover 120.

To support the cover member 100, the housing 200 may be disposed below the cover member 100.

The housing 200 may support the end region of the cover member 100. The housing 200 surrounds bottom and side surfaces of the display panel 300 to protect the display panel 300 from external impact and contamination.

The housing 200 may be formed integrally or separately. In the case of a separation-type housing, the first housing portion 210 and the second housing portion 220 may be included. The first housing portion 210 may be a portion bonded to the cover member 100, and the second housing portion 220 may be a portion disposed below the first housing portion 210.

The end region of the cover member 100 supported by the housing 200 may have a flat bottom surface or a curvature. A shape of an upper surface of the housing 200 bonded to the end region of the cover member 100 may be formed to correspond to a shape of an end of the cover member 100.

For example, when the shape of the end of the cover member 200 is flat, the upper surface of the housing 200 may also be formed flat, and when the shape of the end of the cover member 200 has a curvature, the shape of the upper surface of the housing 200 may also be formed to have a curvature.

Figure 6:
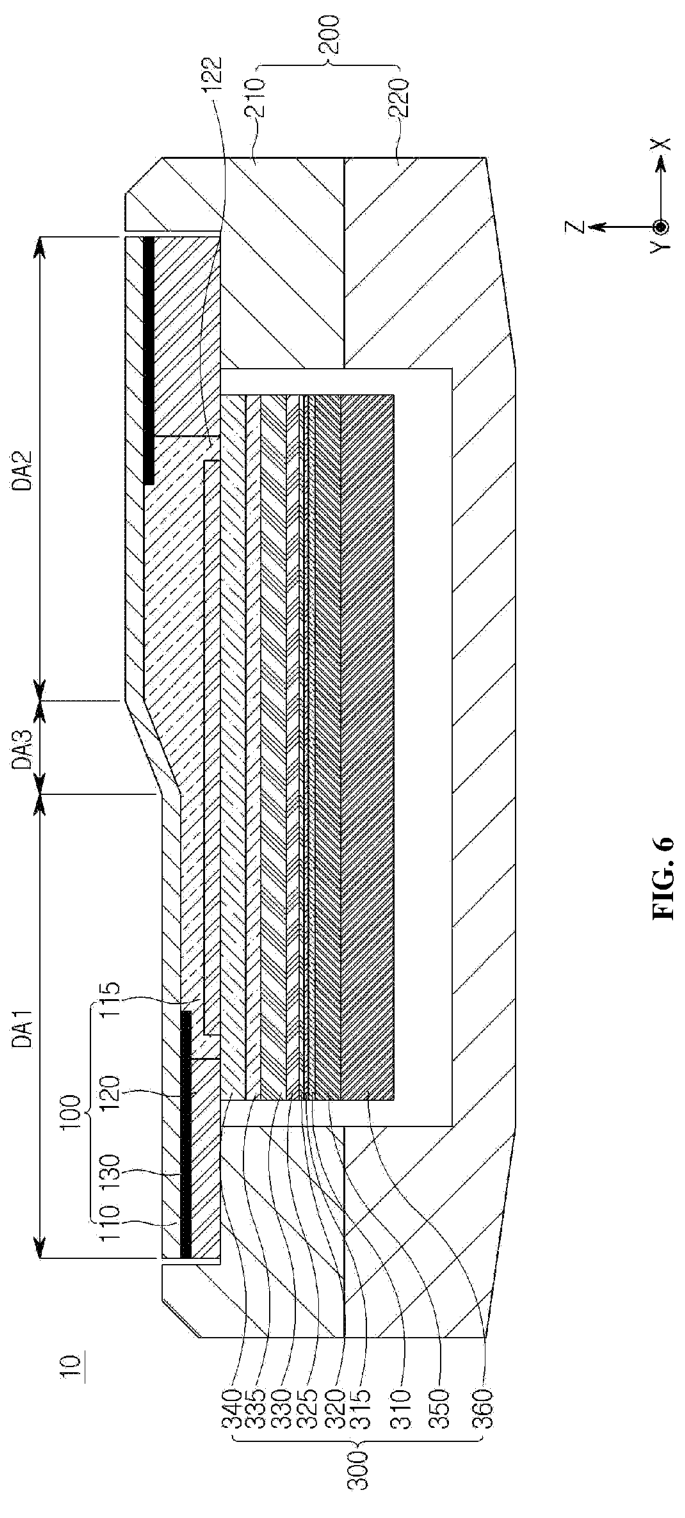

FIG. 6 is a cross-sectional view of the display device according to still another embodiment of the present disclosure.

Referring to FIG. 6, the display device 10 may include the cover member 100, the housing 200 and the display panel 300.

The cover member 100 may include the first cover 110, the second cover 120 positioned below the first cover 110, the light blocking member 130 and the filler 115.

The first cover 110 may include a first region DA1 on a left side, a second region DA2 on a right side, and a third region DA3 positioned between the first region DA1 and the second region DA2, and connecting the first region DA1 and the second region DA2. Top surfaces of the first region DA1 and the second region DA2 of the first cover 110 may be formed to be flat, and a top surface of the third region DA3 may be formed along an oblique direction.

In terms of a cross-section of the cover member 100, the first region DA1 may be formed thinner than the first region DA1, and the second region DA2 may be thicker than the first region DA1. The third region DA3 is a region connecting the first region DA1 and the second region DA2, and becomes thicker from a region connected to the first region DA1 toward a region connected to the second region DA2.

The injection hole 122 is formed in the second cover 120, such that the filler 115 can be injected between the first cover 110 and the second cover 120. The filler 115 may be inserted between the first cover 110 and the second portion 126. The filler 115 may be made of a material such as an optical clear resin (OCR) having a high adhesion, high transmittance, and low viscosity. Since the filler 115 has properties of a liquid similar to that of resin, the filler 115 can fill all the empty spaces between the first cover 110 and the second cover 120.

In addition, since a lower surface of the second cover 120 is formed flat, the display device 10 having a plurality of heights may be formed using the display panel 300 in a form of a flat plate.

When the display device 10 according to the embodiment of the present disclosure is applied to the display device 10 in which a dashboard, a navigation device, and the like of a vehicle are connected as a whole and implemented as one, the first region DA1 may be applied as the dashboard, and the second region DA1 may be applied as the navigation and the like.

FIG. 6 shows the display device 10 placed on a floor, and in order to apply the display device 10 to the vehicle, the display device 10 is rotated about 80 to 100 degrees about an X axis and applied to the vehicle, and the first region DA1 may be applied as the dashboard, and the second region DA1 may be applied as the navigation and the like.

Figure 7:
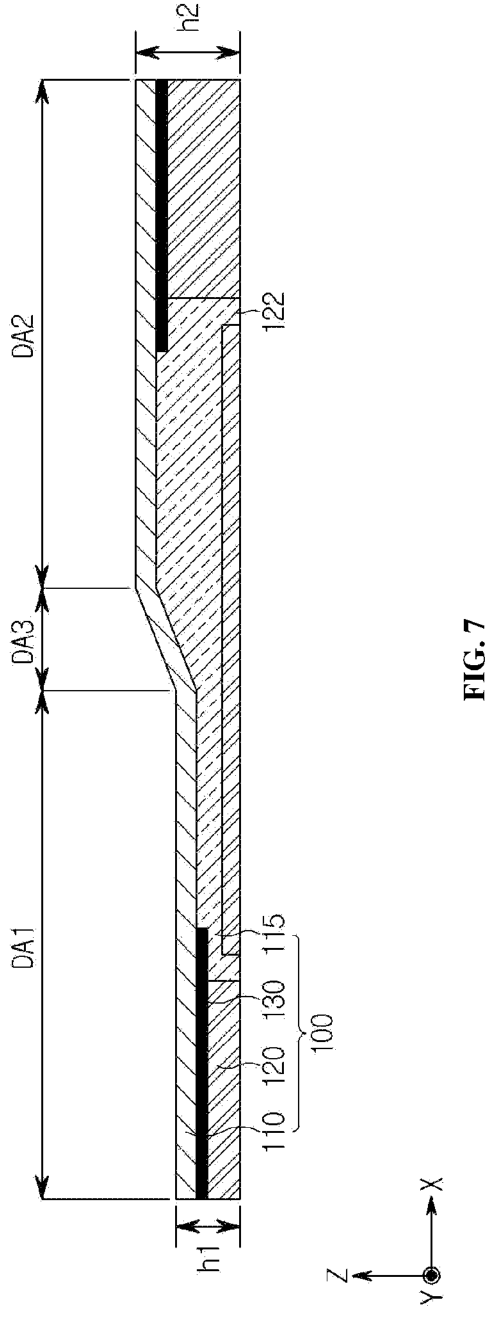
FIG. 7 is a cross-sectional view of the cover member of FIG. 6 according to an embodiment of the present disclosure.

FIG. 7 is a cross-sectional view of the cover member of FIG. 6 according to one embodiment of the present disclosure.

Referring to FIG. 7, a thickness h1 of the first region DA1 of the cover member 100 may smaller than a thickness h2 of the second region DA2 of the cover member 100.

Therefore, when the user views the display device 10 from the front (Z-axis direction), since the first region DA1 is disposed on an inner side than the second region DA2, a distance from the user is formed great, and the second region DA2 may be formed with a small distance from the user.

Since the dashboard is generally placed right in front of the user, if the distance from the user is small, a recognition rate of objects outside the vehicle may decrease and cause an accident, and consequently, the first region DA1, which has a great distance from the user, may be used as the dashboard. Also, since the navigation device and the like are generally disposed on a left or right side of the user, the second region DA2 formed with a small distance from the user may be used as the navigation device in order to improve the visibility of the display device 10 by the user.

In addition, since the first region DA1 and the second region DA2 are connected by the third region DA3 and integrally formed without disconnection, images may be implemented in a wide area, and an improved design of the display device 10 with an improved sense of unity and user visibility may be provided.

The third region DA3 may be used to display information such as a vehicle condition.

Figure 8:
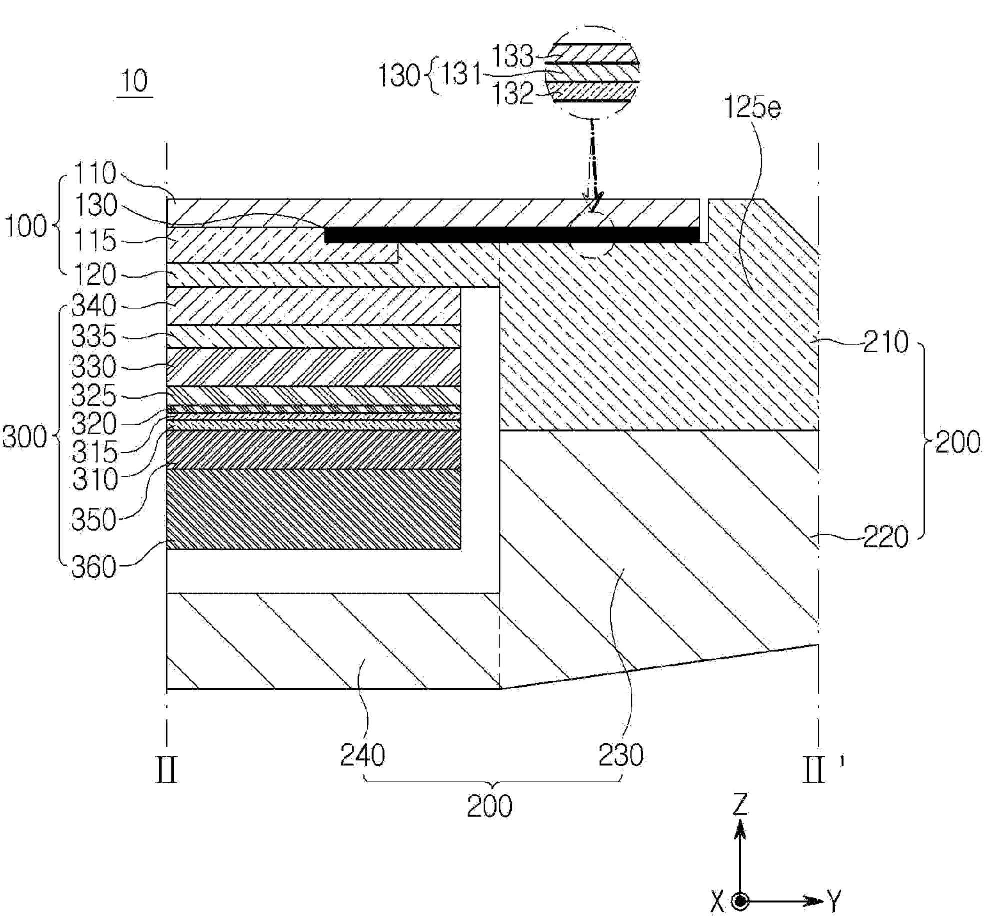
FIG. 8 is a cross-sectional view taken along line II-II' in FIG. 1, which shows still another embodiment of the present disclosure.

FIG. 8 is a cross-sectional view taken along line II-II' in FIG. 1, which shows still another embodiment of the present disclosure.

Referring to FIG. 8, the display device 10 may include the display panel 300 on which an image is displayed, the cover member 100 having the first cover 110, the light blocking member 130, and a second cover 125 disposed on the display panel 300, and the housing 200.

The housing 200 may include a first housing portion 230 positioned next to the display panel 300 while supporting the second cover 125 and a second housing portion 240 positioned below the display panel 300.

The second cover 125 may include a second cover extension **125*e* located in correspondence with the first housing portion 230, and the second cover extension 125*e* may be connected to (or may be combined with, seated in) the first housing portion 230. A connecting member such as an adhesive, a fixing member, or a connector may be disposed between the second cover extension 125*e* and the first housing portion 230, and the second cover extension 125*e* and the first housing portion 230** may be connected to (or may be combined with, seated in) each other by the connecting member.

According to the embodiment of the present disclosure, since the second cover 125 includes the second cover extension **125*e* serving as an upper end of the housing, a structure of the housing 200** may be simplified, and the overall bonding process may be reduced.

For example, the second cover 125 may have a structure in which the second cover 125 and the first housing portion 210 of the embodiment disclosed in FIG. 2A are integrally formed, and compared to the embodiment disclosed in FIG. 2A, a bonding process between the first housing portion 210 and the second housing portion 220 may be omitted, and the structure of the housing 200 may be simplified.

Accordingly, a planar size of the second cover 125 may be the same as a planar size of the housing 200, and a side of the display device 10 where the cover member 100 and the housing 200 are bonded may have a structure formed in a straight line without protruding parts. A planar size of the second cover extension 125*e* may be formed the same as a planar size of the first housing portion 230. A planar size may be a size recognized by the user from a front of the display device 10 (Z-axis direction).

The second cover extension 125*e* and the first housing portion 230 are located next to the display panel 300 to protect the display panel 300 from external impact and contamination applied to the side of the display device 10.

The cover member 100 may further include the filler 115 disposed between the first cover 110 and the second cover 125. The injection hole 122 is formed in the second cover 125, and through the injection hole 122, the filler 115 may be inserted between the first cover 110 and the second cover 125.

Since the filler 115 has a low viscosity, it prevents or at least reduces air bubbles and the lift phenomenon caused by the stepped portion of the light blocking member 130 and allows the cover member 100 to have a shock absorption function.

Since the filler 115 is applied to the cover member 100, generation of air bubbles may be prevented regardless of a thickness of the light blocking member 130. Accordingly, it is possible to form the light blocking member 130 to be a thick layer including the first layer 132, the base substrate 131 and the second layer 133, such that the light blocking member 130 has a function of blocking light and a function of adhering and fixing the first cover 110 and the second cover 120 thereto.

The first layer 132 may be disposed below the base substrate 131, and the second layer 133 may be disposed on the base substrate 131, and the base substrate 131 may have a function of blocking light, and the first layer 132 and the second layer 133 may have a function of adhering the first cover 110 and the second cover 120 thereto.

In the cover member 100, the filler 115 may be omitted. The cover member 100 may be configured by disposing the light blocking member 130 in the first cover 110 and disposing the second cover 125 below the light blocking member 130. The second cover may be fixed or attached to the first cover 110 by the light blocking member 130.

Accordingly, a separation space may be formed in a partial region between the first cover 110 and the second cover 125. The separation space may be filled with air or other gas.

In a structure in which the filler 115 is omitted in the separation space between the first cover 110 and the second cover 125, the light transmittance may be higher compared to the structure filled with the filler 115, but the shock absorption performance may be lowered. In addition, since there is no transparent adhesive material covering the light blocking member 130, bubbles and the lift phenomenon caused by the transparent adhesive material can be prevented.

The display device according to the present disclosure may be described as follows.

The display device according to the present disclosure may include a display panel on which images are displayed; and a cover member disposed on the display panel and having a first cover, a light blocking member, and a second cover.

According to some embodiments of the present disclosure, the cover member may further include a filler disposed between the first cover and the second cover.

According to some embodiments of the present disclosure, the second cover may include an injection hole.

According to some embodiments of the present disclosure, a size of the second cover may be greater than a size of the display panel.

According to some embodiments of the present disclosure, the display device may further include a housing supporting an end region of the cover member.

According to some embodiments of the present disclosure, the housing may include a first housing portion and a second housing portion, and the cover member may be connected to the first housing portion, and the first housing portion may be connected to the second housing portion.

According to some embodiments of the present disclosure, the light blocking member may include a base substrate, a first layer disposed below the base substrate, and a second layer disposed on the base substrate.

According to some embodiments of the present disclosure, an upper surface of the cover member may have a constant curvature along a first direction, and a lower surface of the cover member may be flat.

According to some embodiments of the present disclosure, the first cover may have a curvature along a first direction, and an upper surface of the second cover may have a curvature along a first direction, and a lower surface thereof may be flat.

According to some embodiments of the present disclosure, the first cover may include a first region and a second region with flat upper surfaces, and a third region located between the first region and the second region and having an upper surface disposed along an oblique direction, and the second cover may have a flat lower surface.

According to some embodiments of the present disclosure, the cover member may include a first region having a first thickness and a second region having a second thickness, and the thickness of the first region and the thickness of the second region may be different.

According to some embodiments of the present disclosure, a display device may include: a display panel on which images are displayed; a cover member disposed on the display panel and having a first cover, a light blocking member, and a second cover; and a housing having a first housing portion positioned next to the display panel while supporting the second cover, and a second housing portion positioned below the display panel.

According to some embodiments of the present disclosure, the second cover may include a second cover extension positioned to correspond to the first housing portion, and the second cover extension may be connected to the first housing portion.

According to some embodiments of the present disclosure, a planar size of the second cover may be the same as a planar size of the housing.

According to some embodiments of the present disclosure, the second cover extension and the first housing portion may be located next to the display panel.

According to some embodiments of the present disclosure, the cover member may further include a filler disposed between the first cover and the second cover.

According to some embodiments of the present disclosure, the second cover may include an injection hole.

According to some embodiments of the present disclosure, the light blocking member may include a base substrate, a first layer disposed below the base substrate, and a second layer disposed on the base substrate.

The present invention has been described in more detail with reference to the exemplary embodiments, but the present invention is not limited to the exemplary embodiments. It will be apparent to those skilled in the art that various modifications can be made without departing from the technical sprit of the invention. Accordingly, the exemplary embodiments disclosed in the present invention are used not to limit but to describe the technical spirit of the present invention, and the technical spirit of the present invention is not limited to the exemplary embodiments. Therefore, the exemplary embodiments described above are considered in all respects to be illustrative and not restrictive. The protection scope of the present invention must be interpreted by the appended claims and it should be interpreted that all technical spirits within a scope equivalent thereto are included in the appended claims of the present invention.

REFERENCE NUMERALS

| | |
|---|---|
| 10: display device | 100: cover member |
| 110: first cover | 115: filler |
| 120: second cover | 125e: second cover extension |
| 130: light blocking member | 131: base substrate |
| 132: first layer | 133: second layer |
| 122: injection hole | 124: first portion |
| 126: second portion | da1: first region |
| Da2: second region | da3: third region |
| 200: housing | 210: first housing portion |
| 220: second housing portion | 230: first housing portion |
| 240: second housing portion | 300: display panel |
| 310: display substrate | 315: thin film transistor array |
| 320: light emitting layer | 325: encapsulation member |
| 330: first adhesive layer | 335: touch film |
| 340: second adhesive layer | 350: support member |
| 360: heat dissipation plate | |

What is claimed is:

1. A display device, comprising:

a display panel on which images are displayed, the display panel including a display area and a non-display area; and a cover member on the display panel, the cover member including a first cover, a light blocking member, and a second cover, wherein the second cover comprises an injection hole overlapping the light blocking member, wherein the cover member corresponds to the non-display area, which is an edge area of the display panel, and surrounds the display area, wherein the injection hole overlaps the non-display area, and wherein the injection hole is disposed between the display panel and the first cover.

2. The display device of claim 1, wherein the cover member further comprises a filler between the first cover and the second cover.

3. The display device of claim 1, wherein a size of the second cover is greater than a size of the display panel.

4. The display device of claim 1, further comprising:

a housing supporting an end region of the cover member.

5. The display device of claim 4, wherein the housing comprises a first housing portion and a second housing portion, and the cover member is connected to the first housing portion, and the first housing portion is connected to the second housing portion.

6. The display device of claim 1, wherein the light blocking member comprises a base substrate, a first layer below the base substrate, and a second layer on the base substrate.

7. The display device of claim 1, wherein an upper surface of the cover member has a constant curvature along a first direction, and a lower surface of the cover member is flat.

8. The display device of claim 1, wherein the first cover has a curvature along a first direction, and an upper surface of the second cover has a curvature along the first direction, and a lower surface thereof is flat.

9. The display device of claim 1, wherein the first cover comprises a first region and a second region with flat upper surfaces, and a third region located between the first region and the second region and the third region having an upper surface disposed along an oblique direction, and the second cover has a flat lower surface.

10. The display device of claim 1, wherein the cover member comprises a first region having a first thickness and a second region having a second thickness that is different from the first thickness.

11. A display device, comprising:

a display panel on which images are displayed, the display panel including a display area and a non-display area;

a cover member on the display panel, the cover member having a first cover, a light blocking member, and a second cover; and a housing having a first housing portion positioned adjacent to the display panel while supporting the second cover, and a second housing portion positioned below the display panel, wherein the second cover comprises an injection hole overlapping the light blocking member, wherein the cover member corresponds to the non-display area, which is an edge area of the display panel, and surrounds the display area, wherein the injection hole overlaps the non-display area, and wherein the injection hole is disposed between the display panel and the first cover.

12. The display device of claim 11, wherein the second cover comprises a second cover extension positioned to correspond to the first housing portion, and the second cover extension is connected to the first housing portion.

13. The display device of claim 11, wherein a planar size of the second cover is a same as a planar size of the housing.

14. The display device of claim 12, wherein the second cover extension and the first housing portion are located adjacent to the display panel.

15. The display device of claim 11, wherein the cover member further comprises a filler between the first cover and the second cover.

16. The display device of claim 11, wherein the light blocking member comprises a base substrate, a first layer below the base substrate, and a second layer on the base substrate.

* * * * *